United States Patent
Ho et al.

(10) Patent No.: US 7,023,519 B2
(45) Date of Patent: Apr. 4, 2006

(54) INTERNAL HEATER EMBEDDED IN AN LCD CELL

(75) Inventors: Kay Pui Ho, Tseung Kwan O (HK); Richard C. H. Lee, Tseung Kwan O (HK); Ying Leung Law, Tseung Kwan O (HK); Ching Chuen Leung, Tseung Kwan O (HK)

(73) Assignees: Varintelligent (BVI) Limited, (VG); Terence Leslie Johnson, (GB)

( * ) Notice: Subject to any disclaimer, the term of this patent is extended or adjusted under 35 U.S.C. 154(b) by 0 days.

(21) Appl. No.: 10/001,674

(22) Filed: Oct. 31, 2001

(65) Prior Publication Data

US 2002/0089638 A1    Jul. 11, 2002

(30) Foreign Application Priority Data

Oct. 31, 2000    (GB) ..................................... 0026616

(51) Int. Cl.
*G02F 1/1333*    (2006.01)

(52) U.S. Cl. ..................................... 349/161
(58) Field of Classification Search ........... 349/20–22, 349/161
See application file for complete search history.

(56) References Cited

U.S. PATENT DOCUMENTS

| 4,093,355 | A  |   | 6/1978  | Kaplit et al. |         |
|-----------|----|---|---------|---------------|---------|
| 6,128,053 | A  | * | 10/2000 | Brandt et al. | 349/72  |
| 6,317,178 | B1 | * | 11/2001 | Brandt et al. | 349/72  |

FOREIGN PATENT DOCUMENTS

| EP | 915360 A2 | * | 5/1999  |
|----|-----------|---|---------|
| GB | 2360851   |   | 10/2001 |
| JP | 57148722  |   | 9/1982  |
| JP | 3-118517 A | * | 5/1991 |
| JP | 03118517  |   | 5/1991  |
| JP | 6-260265 A | * | 9/1994 |
| JP | 06260265  |   | 9/1994  |
| WO | WO 99/06885 |  | 2/1999 |

* cited by examiner

*Primary Examiner*—Erik Kielin
(74) *Attorney, Agent, or Firm*—Blakely Sokoloff Taylor & Zafman

(57) ABSTRACT

The invention relates to an ITO heater for a liquid crystal display, typically a DSTN display which comprises an active liquid crystal cell for optical modulation, characterized by a dummy cell adapted for optical compensation comprising two substrates with liquid crystal therebetween, by a heater, the heater comprising a transparent conductive layer applied to one of the substrates, and by the dummy cell further comprising electrically conductive spacing means for simultaneously maintaining a desired cell gap and equalizing the electrical potential between the two substrates.

31 Claims, 2 Drawing Sheets

INTERNAL HEATER EMBEDDED IN AN LCD CELL

BACKGROUND OF THE INVENTION

The invention relates to an ITO heater, particularly to such a heater for a liquid crystal display or LCD,

DESCRIPTION OF THE RELATED ART

Liquid crystal displays are extensively used in many applications. As will be understood, the liquid crystal layer acts as a light modulating mechanism controlling light transmission or reflection. This light modulating mechanism can be controlled electrically. The response time of the liquid crystal materials used in LCDs is usually temperature dependent, especially for more viscous liquid crystal fluids. For example, the response is very sluggish and slow when the temperature is low. Some way of regulating the temperature is required. When the surrounding temperature is too low, some heat has to be pumped in to bring the temperature of the device to a reasonable value. This can be in an external way, where the display is in a temperature controlled environment.

BRIEF SUMMARY OF THE INVENTION

This arrangement is expensive as the whole environment has to be brought to a desired operating temperature for the LCD, and can also be difficult to control in any event.

It is accordingly an object of the invention to seek to mitigate these disadvantages.

According to a first aspect of the invention there is provided a heater for a liquid crystal display (LCD), characterised by a dummy cell, adapted for use in the LCD, by a heater, and by the heater being embedded in the dummy cell.

According to a second aspect of the invention there is provided a liquid crystal display, comprising an active liquid crystal cell for optical modulation, characterised by a dummy cell adapted for optical compensation comprising two substrates with liquid crystal therebetween, by a heater, the heater comprising a transparent conductive layer applied to one of the substrates, and by the dummy cell further comprising electrically conductive spacing means for simultaneously maintaining a desired cell gap and equalizing the electrical potential between the two substrates.

Thus using the invention it is possible to provide a generation of heat internally of an LCD display.

In practice, some "warm up" time can be allowed for the heater to heat up the whole display to a desired temperature.

The display may comprise a double STN (DSTN) display which may have a dummy cell adapted for optical compensation.

According to a third aspect of the invention there is provided a device including an LCD display as hereinbefore defined.

The device may be mounted in a vehicle, e.g. an automobile, although a lorry, truck, van, motorcycle, ship, boat or aircraft could utilise such a device.

The heater and a liquid crystal display (LCD) incorporating same are hereinafter described, by way of example, with reference to the accompanying drawings.

DETAILED DESCRIPTION OF THE INVENTION

Figure 1:
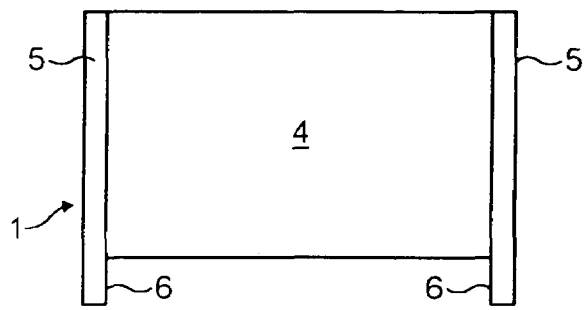
FIG. 1 is a plan view of a heater, in this case an indium tin oxide (ITO) heater, according to the invention.
Figure 2:
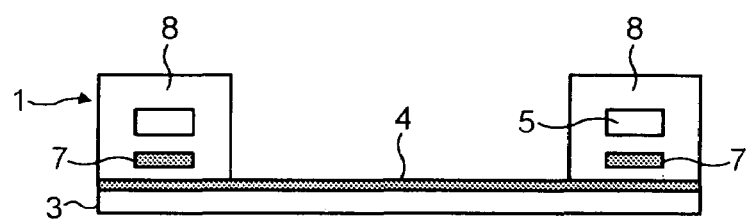
FIG. 2 is a transverse cross-sectional view of the heater of FIG. 1.
Figure 3:
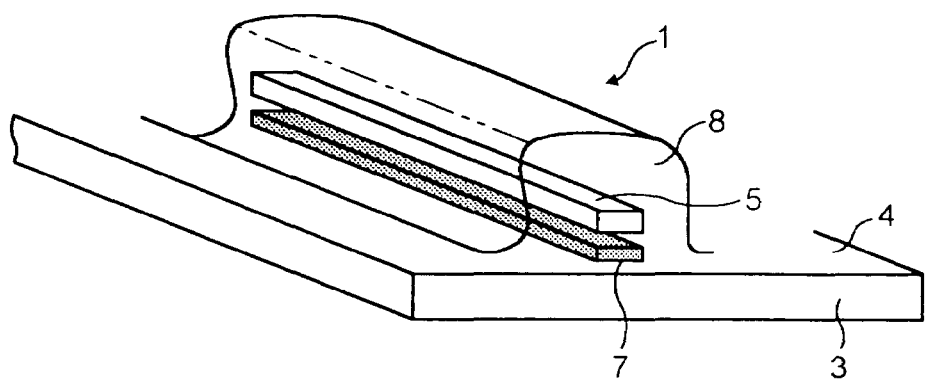
FIG. 3 is, to a larger scale, a perspective view of part of the heater of FIGS. 1 and 2.
Figure 4:
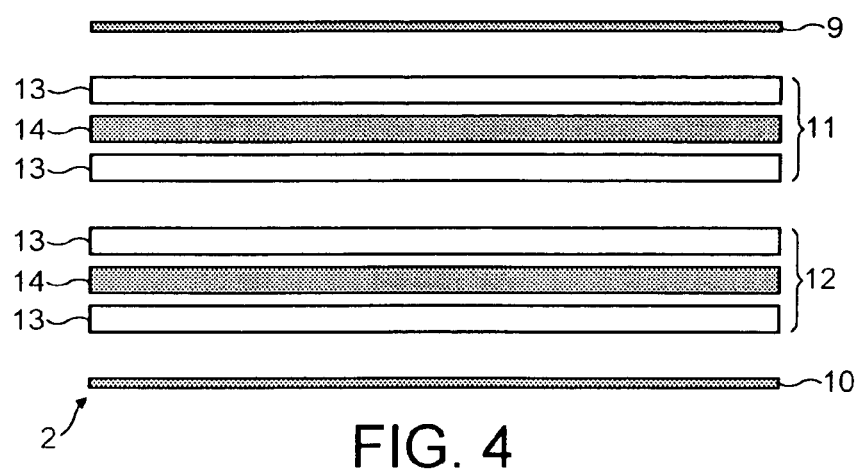
FIG. 4 is a transverse cross-sectional view of a double STN (DSTN) liquid crystal display.

Referring to the drawings, there is shown in FIGS. 1 to 3 and 5 a heater 1 for electrical or electronic components such as liquid crystal displays (LCDs) such as the DSTN display 2 of FIG. 4, comprising a substrate 3 to which is applied a layer 4 of transparent conductive material, in the embodiment illustrated indium tin oxide (ITO), and electrodes 5 secured electrically conductively thereto over the width thereof and extending therebeyond for connection with a source of power (not shown). Thus the electrodes 5 have extensions 6 for connection directly or by wires with a source of alternating applied voltage, in order to actuate the heater to produce heat. The electrodes 5 are substantially parallel whereby to provide for uniform heat distribution.

The substrate is suitably of glass and transparent, according to an embodiment of the invention. Conductive transparent indium tin oxide (ITO) patterned or non-patterned is coated on the substrate, The two conductive electrodes (e.g. metal strip or rod, or flexible printed circuit) are then adhered on the conductive ITO surface. Conductive adhesives 7 (e.g. conventional anisotropic conductive film or conductive glues) are applied to the ITO surface. These adhesives 7 are normally cut in a long strip which are placed at the opposite margins of the substrate which is orthogonal, suitably rectangular. The width of the electrodes 5 is normally between 1.5 mm and 4 mm and the length is the width of the substrate 3 or the width of the ITO coating 4. These long electrodes can be covered by a protective and insulation substance 8 (e.g. silicone) to keep the joint from moisture. The conductive electrodes extend outside the substrate or are elongated by means of soldering with connecting wires to provide the extensions. The elongated portions of extensions 6 of the conductive electrodes 5 are connected to a voltage supply (either DC or AC, preferably square wave AC). When a voltage is applied, the ITO is heated up by means of resistive power dissipation.

The rate of heating up the display is dependent on the voltage and waveform applied to the conductive electrodes of the ITO heater. The "warm up" time for bringing the temperature to that desired is shortened when the voltage (and therefore the power) of the ITO surface is increased or the resistance of the ITO is decreased. On the other hand, there is an intrinsic limitation of the maximum current through the electrodes, conductive adhesives and the ITO film. This limiting value is dependent on the area of the conductive adhesives and the critical current density (determined by the density of conductive beads inside the conductive adhesives) for the current flowing from one electrode to the ITO surface.

Referring now to FIG. 4, there is shown a typical double STN (DSTN) liquid crystal display 2. This comprises, typically top and bottom polarisers 9, 10 and sandwiched therebetween a dummy cell 11 and an active cell 12 each comprising a pair of transparent substrates 13 with a liquid crystal layer 14 therebetween. There is a perimeter seal epoxy 15 with conductive spacers at the edges of the dummy and active cells and sealing the liquid crystal layers 14 between the transparent substrate 13.

A majority of applications of a DSTN is in the dashboards or consoles of automotives. The cold environment of the automotives greatly reduces the optical performance and increases response time of the liquid crystal displays. Because of this temperature dependence, the display is best maintained at a suitable temperature.

Figure 5:
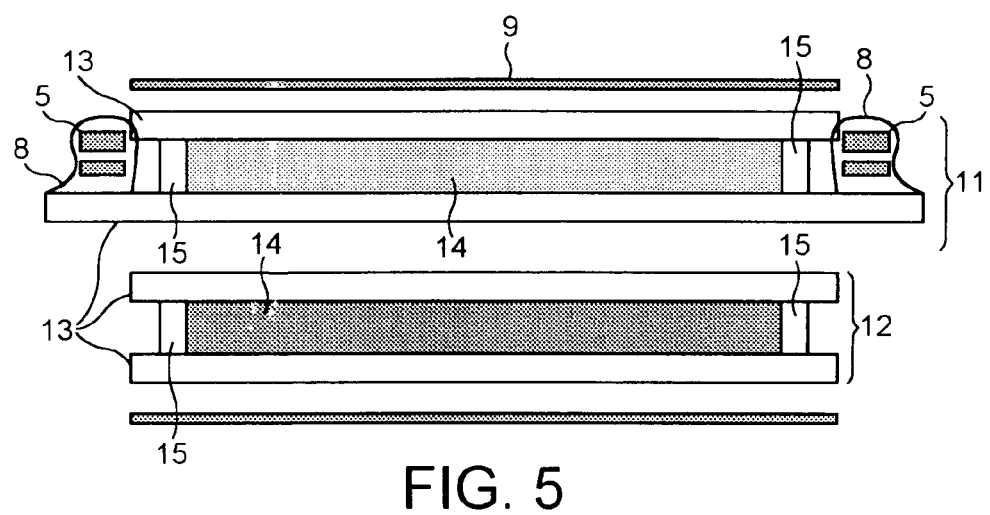
FIG. 5 is a transverse cross-sectional view of the DSTN of FIG. 4 incorporating an ITO heater of FIGS. 1 to 3.
Figure 6:
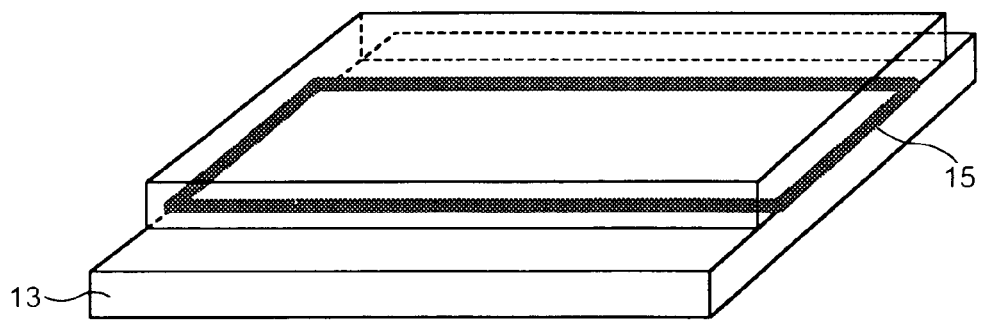
FIG. 6 shows a schematic view with a perimeter seal epoxy with conductive spacers of the dummy cell with ITO heater, with two substantially parallel conductive electrodes removed for clarity.

In LCDs embodying the invention, this is achieved by incorporating an internal ITO heater to keep the display at a suitable temperature For DSTN displays, one of the transparent substrates of the dummy cell is used as an ITO heater, see FIG. 5 in this case, when the ITO heater is ON, there may be some potential difference between the ITO of the upper substrate and the lower substrate of the dummy cell. This may deteriorate the optical compensation of the dummy cell. This phenomenon is called "false triggering". Conductive epoxy or epoxy blended with some conductive spacers is used for this dummy cell where the ITO heater sits. This conductive perimeter epoxy equalizes the potential of the two transparent substrates so as to minimize the occurrence of false triggering. It is also used to maintain a uniform desired cell gap. There are two main points to secure the use of the dummy cell as the heating element. The first one is the conductive adhesive between the electrode and the ITO surface which determines the maximum current. The second one is, the conductive perimeter epoxy between the two glass substrates of the dummy cell, which eliminates false triggering and improves resistance to EMI. To ensure the heating current flow mainly on the ITO heater coating, the sheet resistivity of the ITO coating on the other substrate is selected to be much bigger than that of the ITO heater. A ratio of more than 10:1 is appropriate. This arrangement also ensures no chance of open circuit between the ITO electrodes because of large current flowing through the conductive spacers. To shorten the "warm up" time, a larger power dissipated from the ITO heater is required. It needs a larger affordable current in the ITO heater. When the contact area or the critical current density of the conductive adhesive is increased, the affordable current is increased. For the conductive epoxy, one can increase conductive spacer density in the epoxy or use asymmetric resistivities. That means, one of the substrates has a large ITO resistivity so that the current flowing through the conductive epoxy is much reduced. After the display is heated up to the desired temperature, a smaller power is required in balancing the heat loss due to cooling the environment.

Thus in an ITO heater 1 and DSTN display 2 as described hereinbefore with reference to the accompanying drawings, the ITO heater consists of a (patterned or non-patterned) transparent ITO layer coated on a substrate (e.g. glass substrate), a pair of conductive electrodes (e.g. metal strips or rods, or flexible printed circuit) that is adhered to the ITO surface by some conductive adhesives e.g. anisotropic conductive film (ACF) or conductive glues. These conductive electrodes are connected to a voltage supply directly or via some metal wires. The exposed conductive electrodes can be covered by some protective and insulating material such as silicone. The advantage of using conductive adhesives in connecting the conductive electrodes on the ITO surface over using clips for electrical conduction on the ITO surface is that the former method has better adhesion, less ohmic drop and, more importantly the electric current density on the ITO surface is more uniform over the whole contacting area. This is especially important for the case of double STN (DSTN) where the heater is normally put on either one of the interior surfaces or both of the dummy cell. This ensures that the current flux is below some threshold value, resulting in no false triggering of deteriorated optical compensation. The mechanical adhesion between the electrodes on the ITO surface can be strengthened by additional clipping. Usually an alternating voltage is applied to the ITO heater to heat up the display.

The "warm up" time needed to bring the temperature up to a desired level is mainly dependent on the applied voltage and waveform, the resistance of the ITO heater, the mass of the transparent substrate, the temperature difference between the display and the surrounding. The shorter the warm up time, the larger the power needed. However, the current should not exceed a certain threshold value. This limiting current value is mainly determined by the maximum tolerable loading of the conductive adhesives. As a consequence, there is a minimum warm up time in raising a certain temperature for a given ITO resistivity.

A more detailed description, even though the invention can be applied to general cases, is illustrated in the case of double STN (abbreviated as DSTN) configuration applied to automotives. A DSTN is made up of two polarisers, two liquid crystal layers with four transparent substrates (two transparent substrates and one liquid crystal layer forming the active layer acting for light modulation and the other two transparent substrates and one liquid crystal layer forming the dummy layer acting for optical compensation). A schematic is found in FIG. 4. When the ITO heater is incorporated into the DSTN display, some slight adjustment in the substrate size and ITO resistivity has to be considered. A schematic is found in FIG. 5. The dummy cell acts as light compensation and the active cell is a light modulating mechanism.

It will be understood too that the glue used to connect the electrodes physically and electrically shorted to the ITO surface can be any effective conductive glue other than anisotropic conductive film (ACF). Also, the electrodes may be located at any suitable position on the ITO surface other than at the edges as illustrated Thus they may be located at two opposite shorter or two opposite longer edges of a rectangular substrate. Resistive heat is generated in the ITO surface, the power being dependent on the resistance of the ITO heater and the voltage and waveform supplied across the electrodes of the ITO heater. The resistivities of the ITO surface of a DSTN dummy cell are suitably chosen so that the current flowing from one transparent substrate of the dummy cell to the other transparent substrate is safe and below the critical value tolerable to the conductive perimeter epoxy. Moreover, the conductive adhesives of the ITO heater are selected so that current flowing from a conductive electrode of the ITO to the ITO surface is safe and tolerable to the conductive adhesive. This is to ensure the structural integrity of the heater, and DSTN device, in use. The dimension of the substrate is adjusted to allow for placement of the electrodes 5.

Protective and insulating materials are used to cover and protect the conductive electrodes of the ITO heater. When used with a DSTN display such a display does not evidence false triggering in optical compensation when the ITO heater is turned on, and moreover such a display shows improved resistance to electromagnetic interference (EMI).

Using the invention since the ITO heating element is embedded inside the dummy cell of the DSTN display, no ITO is exposed to any humidity or air (either encapsulated inside the cells and covered by liquid crystals or covered by protective and insulating materials at the areas of electrical contacts) The whole DSTN has good reliability against harsh environment. Stated in another way, the ITO surface is inserted inside the dummy LCD cell, so that there is no ITO corrosion due to the effects of ambient atmosphere, e.g. moisture and air, in use. The ITO surface is thus embedded inside the dummy LCD cell of the DSTN.

No additional transparent substrate with ITO coating is required. The insertion of the ITO heater is highly cost effective. The epoxy in the lamination of the dummy cell is electrically conductive (equalizing the electric potentials of the two ITO surfaces in the z-direction) so that there is no false triggering. Electrical contact between the conductive electrodes and the ITO surface can be further enhanced by additional mechanical means such as securing clips (not shown). The pixel gap of the Varitronix invention is maintained to be fine and is able to be adopted in high resolution displays.

It will be understood too that a heater according to the invention may be placed on any surface of an LCD, e.g. inside or outside, whether in contact with the liquid crystal layer or not.

We claim:

1. A heater for a liquid crystal display (LCD), comprising:
   (i) a dummy cell,
   (ii) said dummy cell being adapted for use in the LCD,
   (iii) said dummy cell comprising two substrates with liquid crystal therebetween;
   (iv) a heater;
   (v) said heater comprising a transparent conductive layer applied to one of the substrates;
   (vi) wherein there are two conductive electrodes for the heater, one at each respective opposite side of the transparent conductive layer and secured thereto by a conductive adhesive;
   (vii) electrically conductive spacing means of said dummy cell for simultaneously maintaining a desired cell gap and equalizing the electric potential between said two substrates; and
   (viii) the heater being embedded in the dummy cell.

2. A heater as defined in claim 1, wherein the heater comprises an indium tin oxide (ITO) heater.

3. A heater as defined in claim 1 wherein the display comprises an active liquid crystal cell for light modulation, and a dummy cell adapted for optical compensation comprising two substrates with liquid crystal there between, wherein the transparent conductive layer of the heater is formed on one of the substrates of the dummy cell, and wherein the dummy cell further comprises electrically conductive spacing means for simultaneously maintaining the desired cell gap and equalizing the electrical potential between the two substrates.

4. A heater as defined in claim 1, wherein there are two conductive electrodes for the heater, one at each respective opposite side of the layer and secured thereto by a conductive adhesive.

5. A heater as defined in claim 4, wherein the conductive adhesive comprises an anisotropic electrically conductive film.

6. A heater as defined in claim 4, wherein the conductive adhesive comprises electrically conductive glue.

7. A heater as defined in claim 4, wherein the electrodes each comprises an elongate metal electrode, and wherein the electrodes comprise substantially parallel electrodes.

8. A heater as defined in claim 7, wherein the metal electrodes each comprise a metal strip or rod.

9. A heater as defined in claim 4, wherein the electrodes each comprise a flexible printed circuit.

10. A heater as defined in claim 4, wherein the electrodes each comprise a heat seal.

11. A heater as defined in claim 4, wherein there is a protective coating for the electrodes.

12. A heater as defined in claim 4, wherein there is mechanical means to enhance electrical contact between an indium tin oxide (ITO) heater surface and the conductive electrodes.

13. A heater as defined in claim 4, wherein there is a protective and insulating coating for the electrodes.

14. A heater as defined in according to claim 11, wherein the coating comprises silicone.

15. A heater as defined in claim 12, wherein the mechanical means comprises means selected from the group consisting of mechanical clips and clipping devices.

16. A heater as defined in claim 4, wherein the adhesive has electronically conductive beads incorporated therein.

17. A heater as defined in claim 1, wherein the substrate of the heater comprises a transparent substrate of the dummy cell.

18. A heater as defined in claim 17, wherein the heater comprises an upper substrate of the dummy cell.

19. A heater as defined in claim 17, wherein the heater comprises a lower substrate of the dummy cell.

20. A heater as defined in claim 17, wherein the heater comprises upper and lower substrates of the dummy cell.

21. A heater as defined in claim 17, wherein transparent substrates of the dummy cell and heater are laminated by a conductive perimeter adhesive.

22. A heater as defined in claim 18, wherein transparent substrates of the dummy cell and heater are laminated by a conductive perimeter adhesive.

23. A heater as defined in claim 19, wherein transparent substrates of the dummy cell and heater are laminated by a conductive perimeter adhesive.

24. A heater as defined in claim 20, wherein transparent substrates of the dummy cell and heater are laminated by a conductive perimeter adhesive.

25. A heater as defined in claim 19, wherein the adhesive comprises an epoxy resin.

26. A heater as defined in claim 25, wherein the adhesive comprises an epoxy resin and conductive spacers.

27. A heater as defined in claim 23, wherein the epoxy resin comprises a conductive epoxy of high resistivity.

28. A heater as defined in claims 17, wherein the substrate of the heater comprises glass.

29. A heater as defined in claim 17, wherein the heater is in contact with the liquid crystal.

30. A heater as defined in claim 1, wherein the electrodes are connected with a source of electrical power.

31. A heater as defined in claim 1, wherein the heater comprises an indium tin oxide (ITO) heater.

* * * * *